(12) United States Patent
Macek et al.

(10) Patent No.: US 9,810,443 B2
(45) Date of Patent: Nov. 7, 2017

(54) DEVICES, METHODS, AND SYSTEMS FOR DATA-DRIVEN ACCELERATION OF DEPLOYED SERVICES

(71) Applicant: Honeywell International Inc., Morristown, NJ (US)

(72) Inventors: Karel Macek, Prague (CZ); Karel Marik, Revnice (CZ); Joseph S. Majewski, Strongsville, OH (US)

(73) Assignee: Honeywell International Inc., Morris Plains, NJ (US)

( * ) Notice: Subject to any disclaimer, the term of this patent is extended or adjusted under 35 U.S.C. 154(b) by 376 days.

(21) Appl. No.: 14/561,948

(22) Filed: Dec. 5, 2014

(65) Prior Publication Data
US 2016/0161136 A1 Jun. 9, 2016

(51) Int. Cl.
*G05B 13/04* (2006.01)
*F24F 11/00* (2006.01)
*G05B 15/02* (2006.01)

(52) U.S. Cl.
CPC .......... *F24F 11/006* (2013.01); *G05B 13/048* (2013.01); *G05B 15/02* (2013.01); *G05B 2219/2614* (2013.01)

(58) Field of Classification Search
CPC .................. G05B 15/02; G05B 13/048; G05B 2219/2614; F24F 11/006
USPC ........................................................ 700/276
See application file for complete search history.

(56) References Cited

U.S. PATENT DOCUMENTS

| | | | | |
|---|---|---|---|---|
| 5,924,486 A | * | 7/1999 | Ehlers | ................... F24F 11/006 165/238 |
| 8,406,933 B2 | * | 3/2013 | Nagel | ................... H04L 67/125 700/286 |
| 8,761,953 B2 | * | 6/2014 | Friedrich | ............... G05B 13/02 700/19 |
| 2011/0106328 A1 | * | 5/2011 | Zhou | ................... G05B 13/024 700/291 |
| 2014/0067132 A1 | | 3/2014 | Macek et al. | |
| 2014/0128997 A1 | | 5/2014 | Macek et al. | |
| 2014/0222238 A1 | * | 8/2014 | Friedrich | ............... G05B 13/02 700/296 |
| 2014/0249876 A1 | * | 9/2014 | Wu | ........................ G05B 15/02 705/7.12 |
| 2015/0211758 A1 | | 7/2015 | Macek et al. | |
| 2015/0345812 A1 | * | 12/2015 | Murthy | .................. F24F 11/001 700/276 |

(Continued)

*Primary Examiner* — Chun Cao
(74) *Attorney, Agent, or Firm* — Brooks, Cameron & Huebsch, PLLC

(57) ABSTRACT

Devices, methods, and systems for data-driven acceleration of deployed services are described herein. One system includes a database configured to store a plurality of case pairs that correspond to previously calculated models, wherein the previously calculated models are based on a number of features, and wherein each of the plurality of case pairs comprise a first value representative of the number of features and a second value representative of deployed heating, ventilation, and air conditioning (HVAC) resources, a ranking engine configured to rank each of the plurality of case pairs based on a performance of the deployed services, and a deployment engine configured to: receive actual feature values, and deploy HVAC resources based on a comparison between the actual feature values and the plurality of ranked case pairs.

20 Claims, 4 Drawing Sheets

(56) References Cited

U.S. PATENT DOCUMENTS

2015/0346741 A1* 12/2015 Murthy .................. G05B 15/02
700/276

* cited by examiner

DEVICES, METHODS, AND SYSTEMS FOR DATA-DRIVEN ACCELERATION OF DEPLOYED SERVICES

TECHNICAL FIELD

The present disclosure relates to devices, methods, and systems for data-driven acceleration of deployed services.

BACKGROUND

Heating, ventilation, air conditioning (HVAC) systems can utilize supervisory control schemes based on a predictive model that is calculated for an individual HVAC system of a particular building or area within a building. The predictive model can consume a relatively large quantity resources and take a relatively large quantity of time when calculating the predictive model.

Calculating the predictive model a plurality of times for a plurality of different buildings at a central location can be desired for some implementations. When the predictive models are calculated a plurality of times over the course of a particular time period a relatively large quantity of time and computing resources can be required.

DETAILED DESCRIPTION

Figure 1:
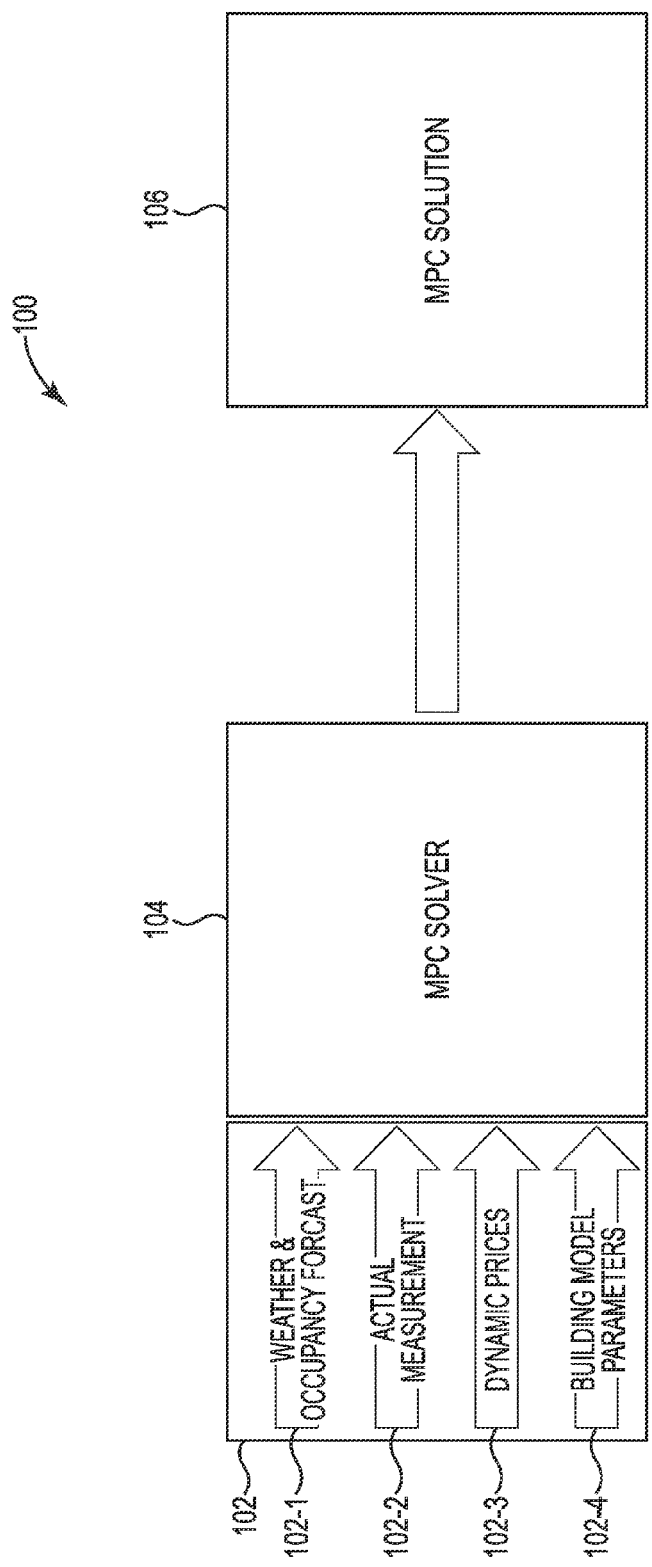
FIG. 1 is an example of a system for model generation according to one or more embodiments of the present disclosure.

Devices, methods, and systems for data-driven acceleration of deployed services are described herein. For example, one or more embodiments include a system that includes a database configured to store a plurality of case pairs that correspond to previously calculated models, wherein the previously calculated models are based on a number of features, and wherein each of the plurality of case pairs comprise a first value representative of the number of features and a second value representative of deployed heating, ventilation, and air conditioning (HVAC) resources, a ranking engine configured to rank each of the plurality of case pairs based on a performance of the deployed services, and a deployment engine configured to: receive actual feature values, and deploy HVAC resources based on a comparison between the actual feature values and the plurality of ranked case pairs.

Devices, methods, and systems for data-driven acceleration of deployed resources can be utilized for deploying heating, ventilation, air conditioning (HVAC) resources for a plurality of different buildings in a plurality of different physical locations. The examples described herein will refer to an HVAC system and HVAC resources for particular examples, but the embodiments described herein are not limited to these particular embodiments. In some embodiments, the plurality of different buildings can include buildings with different floor plans, different sizes, different interior construction materials, different exterior construction materials, among many other variations of construction and features that can affect an efficiency of HVAC resources. In addition, in some embodiments the plurality of different buildings can be at a number of different physical locations (e.g., geographical locations, climates, weather conditions, etc.).

It can be advantageous to monitor and control deployed resources of an HVAC system for a plurality of buildings from a single location. For example, a data center can be utilized monitor and deploy the HVAC resources for a plurality of different buildings within a plurality of different physical locations. However, as described herein, it can also be challenging to monitor and deploy HVAC resources for a plurality of different buildings at a plurality of different locations using previous systems and methods.

The methods and systems described herein can be utilized to efficiently monitor and deploy HVAC resources by utilizing historical data for deployment of HVAC resources under similar conditions for buildings with similar features. The historical data can be converted into a plurality of case pairs. The case pairs can include a first value representing features of a building and a second value representing deployed services based on the features of the building. The historical data can be efficiently compared to actual data for a plurality of buildings and a determination of HVAC resources to deploy can be made with relatively less resources and a relatively lower quantity of time compared to previous systems and methods by converting the historical data into a plurality of case pairs.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" something can refer to one or more such things. For example, "a number of resources" can refer to one or more resources. Additionally, the designator "N", as used herein, particularly with respect to reference numerals in the drawings, indicates that a number of the particular feature so designated can be included with a number of embodiments of the present disclosure.

FIG. 1 is an example of a system 100 for model generation according to one or more embodiments of the present disclosure. The system 100 can be utilized to generate a model (e.g., model for predictive control (MPC), etc.) of a system such as an HVAC system. The model can be utilized to predict resource requirements for an HVAC system. For example, the model for an HVAC system can predict a quantity of resources that may be needed to control a temperature within a particular building or buildings. In this example, controlling the temperature can include providing heating or cooling resources of an HVAC system to the building to maintain a desired temperature.

The system 100 can utilize a number of features 102 for a particular building. The number of features 102 can include weather and occupancy forecasts 102-1 (e.g., current weather conditions, current occupancy, expected occupancy for a particular time period, etc.), actual measurement features 102-2 (e.g., sensor data, temperature sensor data, humidity sensor data, actual occupancy data, etc.), dynamic prices data 102-3 (e.g., price data for electricity, price data for natural gas, etc.), and/or building model parameters (e.g., building information modeling (BIM) data, physical dimensions of a building, size of building, quantity of floors of the building, etc.), among other features 102 that can be utilized to predict a quantity of resources that may need to be deployed in order to maintain a particular temperature.

In some embodiments, the number of features 102 can be assigned a value that corresponds to a level of resources or efficiency of resources based on the combination of the number of features 102. For example, a value can be assigned to the number of features 102 based on a quantity of HVAC resources and/or financial resources required to maintain a particular temperature within a building. In some embodiments, a plurality of values assigned to each of the number of features 102 can be utilized to represent a particular building where HVAC resources are going to be deployed. As used herein, the value assigned to the number of features 102 can include a single representative value or a plurality of values that represent each of the number of features 102. In this example, all of the number of features 102 can be utilized to determine a value that represents the number of features 102. In some embodiments a relatively high value can be assigned when a relatively large quantity of resources may be required to maintain a temperature within the building based on the number of features. For example, the weather and occupancy forecasts 102-1 can indicate a relatively warm exterior temperature for a building and a relatively high quantity of people expected to be within the building. In this example, the actual temperature data 102-2 can indicate that the current interior temperature is above the desired temperature. In addition, in this example, the dynamic prices of electricity and other resources for HVAC utilization are relatively lower during the morning and evening compared to a time period between 8:00 AM and 5:00 PM. Furthermore, in this example, the building model parameters can be utilized to determine a quality of insulation between the interior and exterior is relatively low quality. In this example, a relatively high value can be assigned or a value can be assigned that corresponds to a relatively large quantity of resources that may be needed to maintain a particular temperature for the building.

The model predictive control (MPC) solver 104 (e.g., solver engine) can be utilized to receive the number of features 102 and generate a model that corresponds to the number of features 102. The model can be a model predictive control (MPC) model that can be utilized to model HVAC resources to be deployed over a period of time. For example, the model can be utilized to deploy HVAC resources over the course of a 24 hour period. In this example, a new model can be generated after the completion of the period of time. For example, when the time period is 24 hours a new model can be generated for the building at the end of the 24 hour period.

The model that is generated by the MPC solver 104 can be converted to a value in a similar manner as the number of features 102. That is, the model that is generated can be converted to a value based on features of the model. For example, the features of the model can include, but are not limited to, a quantity of resources deployed at particular times throughout the time period, locations of deployed resources within the building, energy costs of the deployed resources, efficiency of the HVAC system, and/or the type of HVAC system.

The value of the number of features 102 and the value of the model generated by the MPC solver 104 can be stored together as a MPC solution 106. In some embodiments, the number of features 102 and the corresponding model generated by the MPC solver 104 can be stored together as an MPC solution 106 for the particular building and for the particular time period.

The system 100 can be utilized to generate a new MPC solution for each of a number of time periods. Generating a new MPC solution for each of the number of time periods can be time consuming and utilize a relatively large quantity of resources as the quantity of buildings increase.

Figure 2:
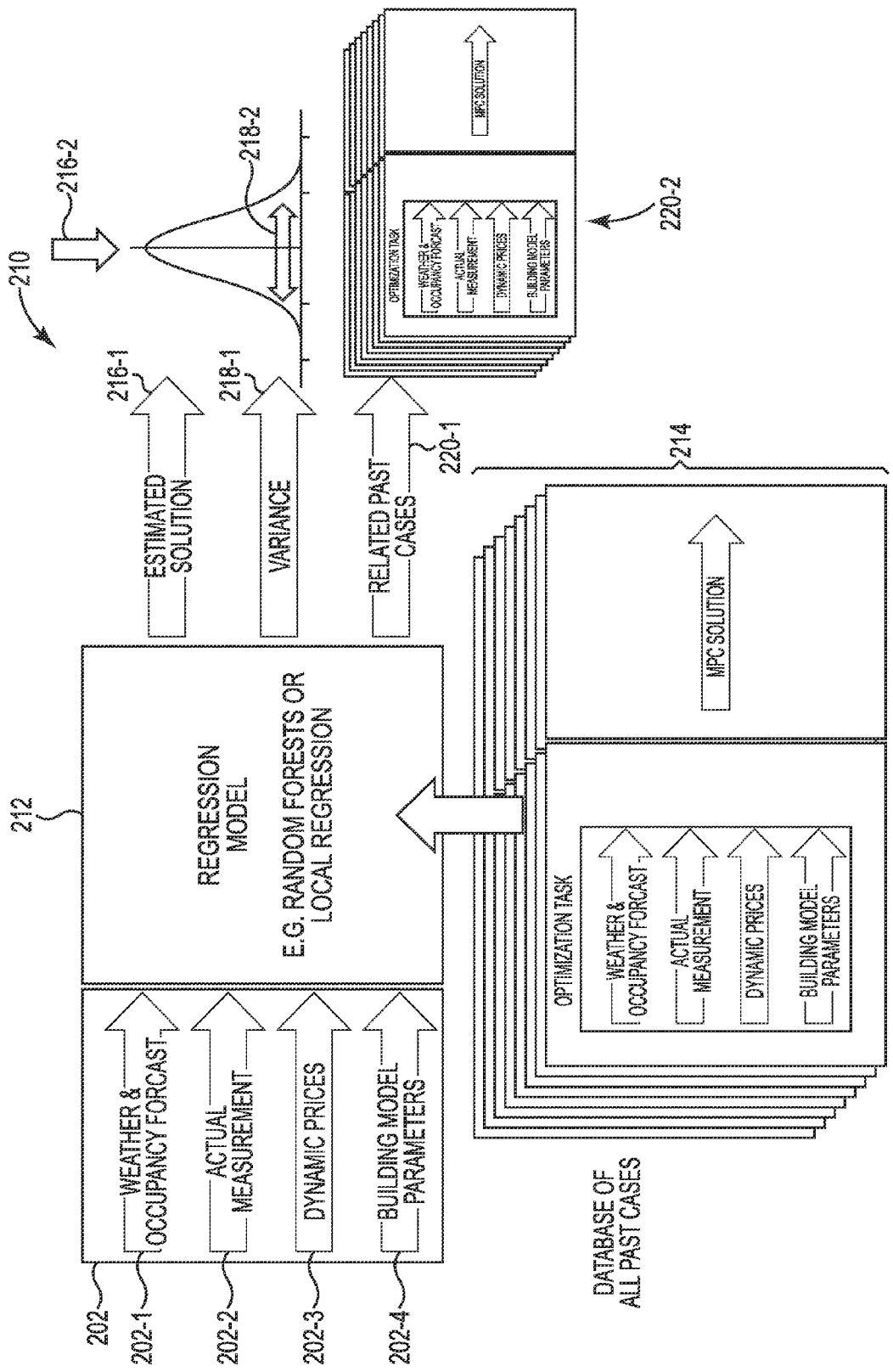
FIG. 2 is an example of a system for data-driven acceleration of deployed services according to one or more embodiments of the present disclosure.

FIG. 2 is an example of a system 210 for data-driven acceleration of deployed services according to one or more embodiments of the present disclosure. The system 210 can include a historical database 214 that comprises a number of past cases (e.g., historical MPC solutions, historical case pairs, etc.). The number of past cases can include stored MPC solutions 106 as referenced in FIG. 1. For example, the stored MPC solutions 106 as referenced in FIG. 1 can be MPC solutions that are generated for a plurality of different building types that are located at a plurality of different physical locations.

Each of the past cases can be stored in the historical database 214 as MPC solutions and/or case pairs as described herein. That is, the historical database 214 can include case pairs for a plurality of MPC solutions that are generated by a system such as system 100 as referenced in FIG. 1. The case pairs can include a first value that represents features of a building with a corresponding second value that represents features of the generated MPC solution and/or model.

The system 210 can receive actual features 202 from a number of buildings. The actual features 202 can be the same and/or similar features 102 as referenced in FIG. 1. The actual features 202 can include weather and occupancy forecasts 202-1, actual measurement data 202-2, dynamic prices 202-3, and/or building model parameters 202-4. The number of features 202 can be utilized to assign a value that corresponds to a level of resources or efficiency of resources that may be needed to maintain a temperature based on the combination of the number of features 202.

The value assigned to the number of features 202 can be compared to values assigned to the features within the historical database 214. When the value assigned to the number of features 202 corresponds to a value of features within the historical database 214, the value of the model can be utilized to deploy the same resources as the corresponding historical value. For example, if there is a value within the historical database 214 that is similar to the value assigned to the number of features 202, the corresponding MPC model of the value within the historical database 214 can be utilized to deploy HVAC resources to the building corresponding to the number of features 202.

In some embodiments, comparing the value within the historical database 214 can include utilizing a regression model 212 of the past cases within the historical database 214 to determine a MPC model that most closely relates to the number of features 202. The regression model 212 can include a linear regression model, a random forests model and/or a local regression model.

An estimated solution 216-1, a variance 218-1, and/or a related past case 220-1 can be determined utilizing the regression model 212. For example, the estimated solution can be an x-value within the regression model. In this example, the x-value of the regression model can be the value that is assigned to the number of features 202. In the same example, the variance 218-2 can be determined for the regression model to determine a relative accuracy of the estimated solution 216-2. In the same example, a number of related past cases 220-1, 220-2 can be determined based on the value assigned to the number of features 202.

In some embodiments, the number of related past cases 220-1, 220-2 can be ranked by a ranking engine based on a performance of the deployed resources for the corresponding value of the number of features within the historical database 214. The performance can include an efficiency, a productivity, and/or an ability to maintain a temperature by the HVAC system utilizing the MPC model from the past case. The performance can be based on a number of monitored metrics of the deployed resources for the HVAC system during the past case. For example, the monitored metrics can include a cost of deploying the resources, the average monitored temperature of the building, feedback provided by occupants of the building, among other monitored metrics during the deployment of the resources.

In some embodiments, ranking the number of past cases 220-1, 220-2 can include ranking a plurality of case pairs that correspond to the number of past cases 220-1, 220-2. In some embodiments, ranking the plurality of case pairs includes calculating a model solution variance for a number of different features. For example, a graph representation can be generated to display a variance of performance (e.g., output) for a number of different deployed services (e.g., input). That is, the ranking can be based in part on the variance of performance for an input value from the plurality of case pairs.

In some embodiments, ranking the plurality of case pairs can include determining a quantity of historical cases that utilized each of the plurality of case pairs. For example, a graph representation can incorporate the quantity of times that a particular input or MPC model has been deployed and utilize the quantity in determining the variance of performance. In some embodiments, ranking the plurality of case pairs can include determining a power usage for an HVAC system that previously utilized each of the plurality of case pairs. For example, a graph representation can incorporate the power usage (e.g., electrical consumption, natural gas consumption, financial cost of power usage, etc.) into the output value as described further herein in reference to FIG. 4. In some embodiments, ranking the plurality of case pairs can include ranking the plurality of case pairs based on a variance and a quantity of historical utilization (e.g., quantity of times a case pair has been deployed, etc.).

The variance 218-1, 218-2 can be determined by comparing a number of deployment executions of the MPC model for corresponding buildings with a particular value. For example, the variance 218-1, 218-2 can include a fluctuation of monitored metrics when the MPC model was utilized to deploy HVAC resources for a particular value assigned to the features of a building. In some embodiments, the variance 218-1, 218-2 can be utilized to determine the estimated solution 216-1, 216-2. For example, the estimated solution 216-1, 216-2 can be determined by calculating a mathematical average (e.g., mean, medium, average, etc.) of the variance to determine an optimal estimated solution 216-1, 216-2.

In some embodiments, the variance 218-1, 218-2 can be utilized to determine if one of the related past cases 220-1, 220-2 can be utilized to deploy a previous MPC model or if a new MPC model needs to be generated for the building that corresponds to the number of features 202. For example, a variance 218-1, 218-2 may be relatively large and therefore it might be determined that with the relatively large variance 218-1, 218-2 a new MPC model should be generated. In some embodiments, a solver engine can be utilized to generate a case pair when the variance 218-1, 218-2 is relatively large. That is, the solver engine can be utilized to generate a case pair for a portion of the received actual feature values. In some embodiments, the solver engine can generate a case pair for the received actual feature values that meet or exceed a threshold variance when compared to the plurality of case pairs.

The system 210 can be utilized to increase performance and decrease a quantity of resources that are utilized to determine an MPC for a number of buildings. By utilizing previously generated MPC models the number of resources to generate new MPC models can be decreased compared to previous systems and methods where MPC models are generated for each building and for every time period. For example, in some embodiments the computing resources can be decreased by 80%. That is, if a previous system utilizes 100 computing devices to generate MPC models for a plurality of buildings the embodiments described herein can provide MPC models for the same plurality of buildings with 20 computers.

Figure 3:
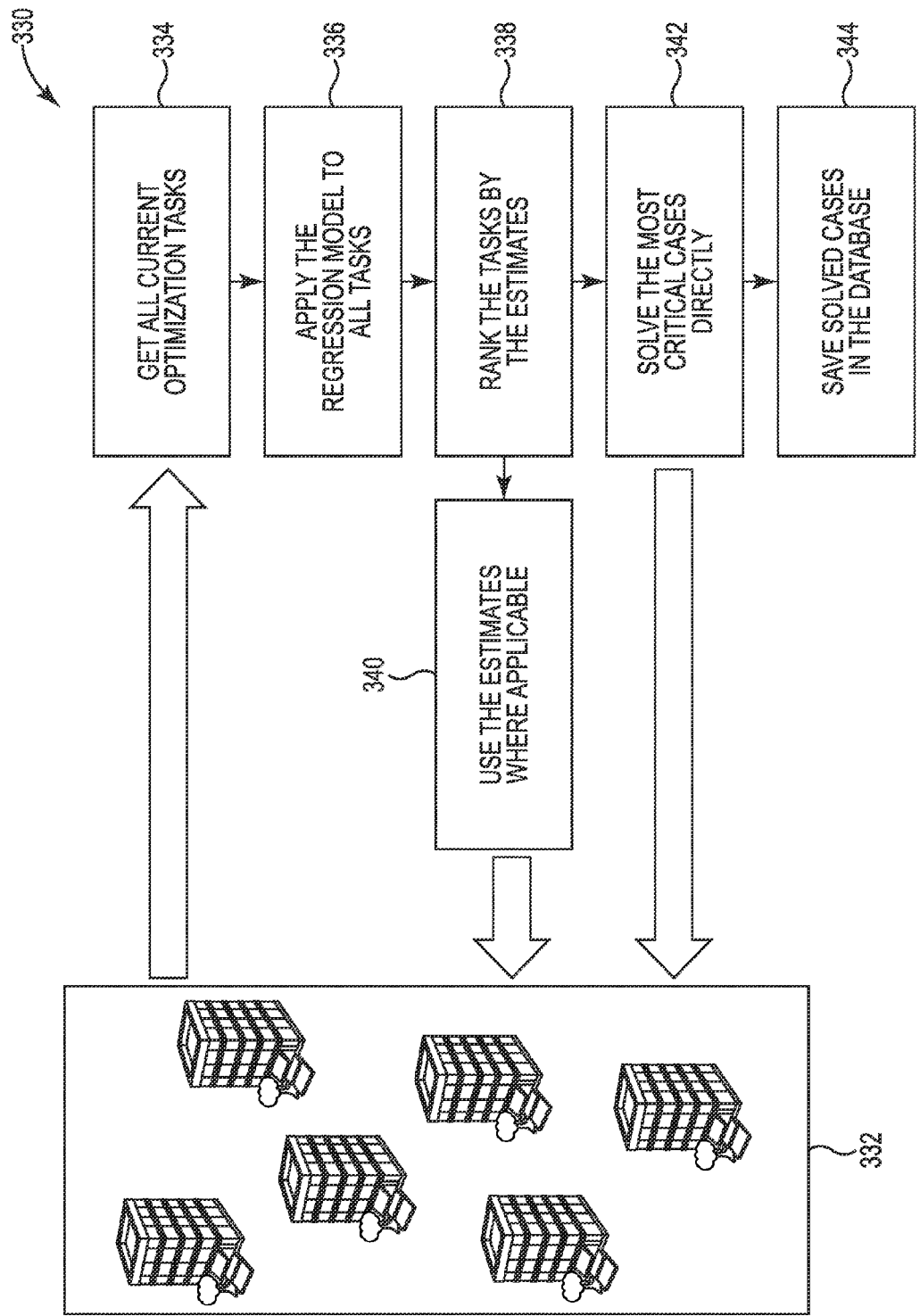
FIG. 3 is an example of a system for data-driven acceleration of deployed services according to one or more embodiments of the present disclosure.

FIG. 3 is an example of a system 330 for data-driven acceleration of deployed services according to one or more embodiments of the present disclosure. The system 330 can utilize the system 100 as referenced in FIG. 1 and/or the system 210 as referenced in FIG. 2 in order to determine and/or generate a number of MPC models for a plurality of buildings 332. The plurality of buildings 332 can comprise a number of different features such as building type, building materials, physical location, climate, weather conditions, actual measurements within the building, dynamic prices, and/or building parameters as described herein. The system 330 can be utilized to deploy HVAC resources to the plurality of buildings 332 based on an MPC model as described herein.

The system 330 can receive current optimization tasks 334 (e.g., past cases, current MPC solutions, etc.) for the plurality of buildings. The current optimization tasks 334 can include MPC models that are currently operating during a particular time period for each of the plurality of buildings. As described herein, the MPC models can be utilized for a particular quantity of time (e.g., time period of 24 hours). In some embodiments, the current optimization tasks 334 can include the MPC models that are within the time period of operation. In other embodiments, the current optimization tasks 334 can include all MPC models that have been utilized to deploy HVAC resources for the plurality of buildings 332.

The received current optimization tasks 334 can be applied to a regression model 336. Applying the optimization tasks 334 to the regression model 336 can determine a number of optimization tasks that are closely related to actual features of a number of buildings from the plurality of buildings 332. As described herein, the current optimization tasks 334 can be stored as a plurality of case pairs. The plurality of case pairs can include a first value that represents a number of features of a particular building and a second value that represents an MPC model that was utilized to deploy resources to the particular building with the number of features. Applying the regression model 336 to the optimization tasks 334 that are stored as case pairs can determine a number of closely related case pairs from the current optimization tasks 334 for received actual features of the plurality of buildings 332.

Applying the regression model 336 can determine a number of estimates for each of the plurality of buildings 332. The number of estimates can include a number of different MPC models that correspond to features of a building that are similar to features of a particular building from the plurality of buildings 332. The number of estimates can be ranked 338. Ranking 338 the number of estimates can be based on a variance of performance for each of the number of estimates that are being ranked. In some embodiments, ranking 338 can be performed for each number of estimates that correspond to each of the plurality of buildings 332. In some embodiments, ranking 338 can be based on a performance of the MPC model for the corresponding features of a building. For example, the performance of the MPC model can be an efficiency of the HVAC system of a corresponding building under the particular features of the building. In this example, the efficiency can include a financial cost of deploying the HVAC resources to the HVAC system of the corresponding building. In addition, the performance can include an ability of the HVAC system to maintain a desired temperature with the deployed HVAC resources under the particular features of the building.

The number of ranked 338 estimates can be applied 340 to the plurality of buildings 332 where applicable. For example, the number of ranked 338 estimates can be utilized to deploy HVAC resources when the ranked 338 estimates are applied 340 to a number of the buildings from the plurality of buildings 332. In some embodiments, only a portion of the ranked 338 estimates are applied 340 to the plurality of buildings 332. In some embodiments, a predetermined quantity of ranked 338 estimates are applied to the plurality of buildings 332 and a predetermined quantity of actual features from the plurality of buildings 332 are utilized to generate a new MPC model.

In some embodiments, the portion of the ranked 338 estimates can be a number of estimates that are at or below a threshold of variance. For example, the portion of the ranked 338 estimates that are applied 340 to the plurality of buildings 332 can include estimates that include a variance that is relatively low and/or below a predetermined threshold.

The relatively low variance can indicate that the expected results of applying 340 the corresponding MPC model for the estimates will likely occur as expected. That is, the variance can include a variance of a number of historic results from applying the MPC model to buildings with a corresponding set of features. For example, a performance value can be assigned to a case pair for the MPC model deployed for a particular set features. In this example, the variance can be a variance between the performance value for a plurality of implementations of the MPC model deployed for the particular set of features. In some embodiments, a relatively high variance can indicate that the expected results and/or performance of applying 340 the corresponding MPC model for the estimates have a relatively high range of variance.

In some embodiments, a threshold value can be utilized to determine a portion of the actual values from the received actual values that have a variance that meets or exceeds the threshold value. For example, the portion of the actual values from the received actual values can include actual values that correspond to a variance of performance that is at or greater than a predetermined threshold. In some embodiments, the portion actual values can be determined based on a predetermined number of MPC models that a system determines to generate for each time period. That is, the portion of the actual values to be utilized to generate a new MPC model is a predetermined quantity of actual values. In some embodiments, the portion of the actual values are utilized to generate a new MPC model for utilization with the corresponding building of the plurality of buildings 332.

In some embodiments, there can be a portion of actual features from the plurality of buildings 332 that do not relate closely to the current optimized tasks 334. In these embodiments, the portion of actual features can be solved 342 and utilized to generate a model such as an MPC model for deploying HVAC resources to a corresponding building relating to the portion of actual features. That is, the system 330 can generate a model solution for the actual values received from the plurality of buildings 332 when a case pair from the plurality of case pairs (e.g., optimization tasks) does not correspond to the received actual values. As described further herein relating system 100 as referenced in FIG. 1, the actual features can be utilized to generate an MPC model that can be utilized to deploy HVAC resources to a building.

When the portion of actual features from the plurality of buildings are solved 342 and utilized to generate a model, the model can be saved in a database of historical database (e.g., historical database 214 as referenced in FIG. 2, etc.). As described herein, the historical database can also include the current optimization tasks 334, previously stored MPC models, and/or case value pairs.

The system 330 can be utilized to provide MPC models for a plurality of buildings utilizing a lower quantity of resources and/or quantity of time compared to previous systems and methods for deploying resources such as HVAC resources.

Figure 4:
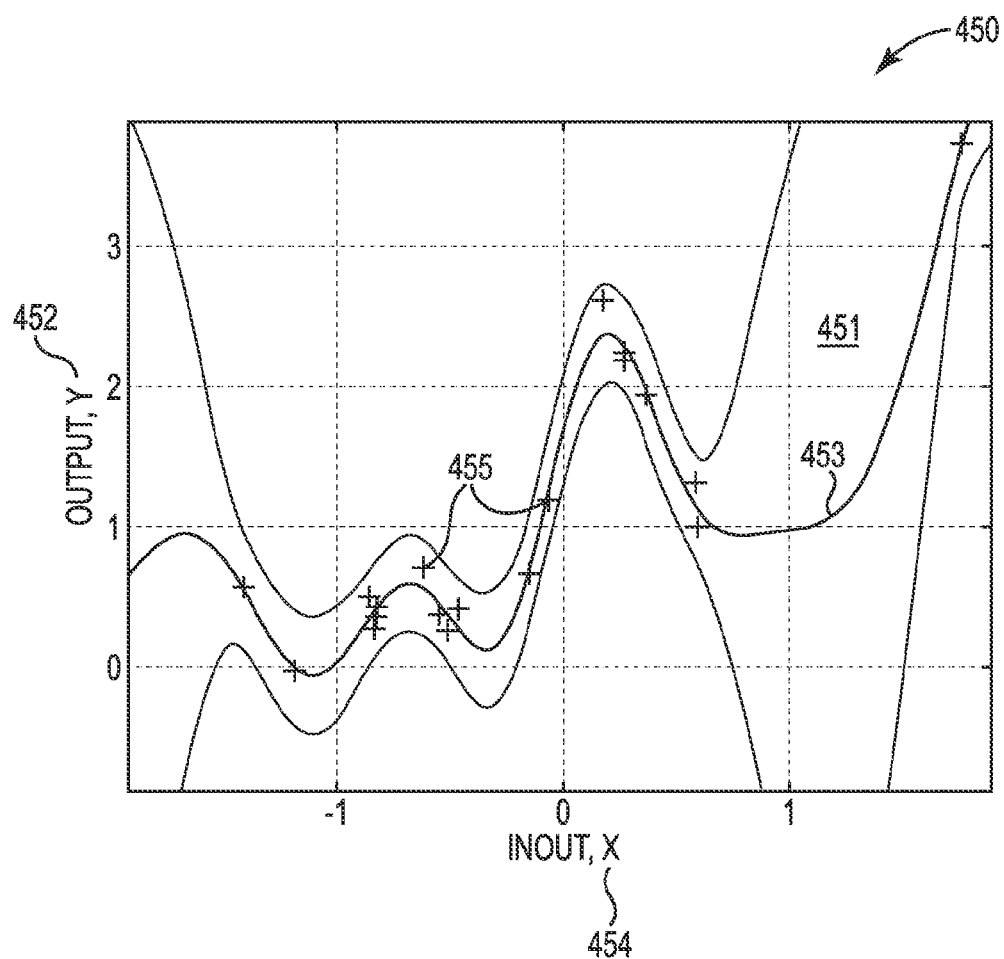
FIG. 4 is an example of a graph representation for an implementation of data-driven acceleration of deployed services according to one or more embodiments of the present disclosure.

FIG. 4 is an example of a graph representation 450 for an implementation of data-driven acceleration of deployed services according to one or more embodiments of the present disclosure. The graph representation 450 can be a representation of a variation of performance for a number of executions of a model such as an MPC model for a particular set of building features as described herein. In some embodiments, the graph representation 450 can be a digital representation that can be utilized by a computing device to determine a variance for a particular set of input values and output values as described herein.

The graph representation 450 can include an x-axis that represents input values 454. The input values 454 can be the representative values of the MPC models for a particular number of features corresponding to a particular building. For example, the input values 454 can represent a single value representative value of an MPC model or the input values 454 can include a plurality of values (e.g., 200 values) that can represent a number of different features of the particular building. In some embodiments, the representative values of the MPC models can be within a range of (−2) through (+2).

The graph representation 450 can include a y-axis that represents output values 452 of the deployed HVAC resources corresponding to the MPC models. The output values 452 can be output values of a regression model and can represent an intensity of operation for a number of set points within a particular building. For example, the output values from a regression model can represent an intensity of operation for an HVAC system for a number of zones and/or set points within a particular building. The output values 452 can include a sensor reading (e.g., temperature reading, power consumption reading, financial cost of power consumption reading, etc.) from a number of sensors within the building. In some embodiments the output values can be converted into representative values that correspond to how well the deployed HVAC resources are able to maintain a desired sensor reading (e.g., desired temperature, desired power consumption, etc.). For example, an output value 452 of 0 can represent that the temperature reading of a number of sensors within the building is at or near the desired temperature. In this example, positive numbers can indicate that the temperature reading of the number of sensors is greater than the desired temperature and negative numbers can indicate that the temperature reading of the number of sensors is lower than the desired temperature. That is, the actual differences between a desired sensor reading and an actual sensor reading can be normalized to a predetermined scale of the y-axis. In some embodiments, the output values can include a representation of a combination of multiple different sensor readings. For example, the out values can include a representation of temperature readings and a cost associated with the deployment of the HVAC resources.

A regression model can be utilized to generate a regression line 453 that can be based on recorded values 455 represented by crosses. The shaded portion can represent the variance 451 of the regression line for the input values 454 and the corresponding output values 452. As described herein, the variance 451 of the input values 454 can be utilized to rank a number of case pairs (e.g., input value 454 and output value 452 pairs). In some embodiments, the smaller the variance 451 can result in a greater ranking of the corresponding case pairs. For example, the case pair that includes an input value 0 and an output value 1 has a relatively small variance can be ranked higher than the case pair that includes an input value of +1 and an output value of +1. In this example, the case pair (+1, +1) may be less reliable than the case pair (0, +1) since there is a greater chance that the output value of the case pair (+1,+1) could be relatively greater than 0 or relatively less than 0.

In some embodiments, a relatively high variance can be utilized to determine that a new model needs to be generated for the case pair. For example, an input of +1 can be determined to have a relatively high variance and it can be determined that a different input should be utilized. In some embodiments, a system 100 as referenced in FIG. 1 can be utilized to determine a new model for the features of a building instead of utilizing the input of +1.

In some embodiments, the graph representation 450 can be utilized to rank a plurality of case pairs by calculating a model solution variance for a number of features of a building. That is, as described herein, the graph representation 450 can be utilized to determine a variance of performance for a number of case pairs (e.g., input values 454 and output values 452 pairs).

As described herein, a "module" can include computer readable instructions that can be executed by a processing resource to perform a particular function. A module can also include hardware, firmware, and/or logic that can perform a particular function.

As used herein, "logic" is an alternative or additional processing resource to execute the actions and/or functions, described herein, which includes hardware (e.g., various forms of transistor logic, application specific integrated circuits (ASICs)), as opposed to computer executable instructions (e.g., software, firmware) stored in memory and executable by a processing resource.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above elements and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A system for data-driven acceleration of deployed services, comprising:
    a database configured to store a plurality of case pairs that correspond to previously calculated models, wherein the previously calculated models are based on a number of building features for a first building, wherein each of the plurality of case pairs comprise a first value and a second value, wherein the first value is representative of the number of building features and an efficiency associated with the number of building features for the first building, wherein the first value is representative of a predicted quantity of resources for a particular time required to maintain a particular temperature within the first building based on the number of building features, wherein the second value is representative of deployed heating, ventilation, and air conditioning (HVAC) resources based on a combination of the number of building features and environmental features of the first building, and wherein the second value is representative of a model predictive control (MPC) value that was used to deploy resources to the first building at the particular time;
    a ranking engine configured to rank each of the plurality of case pairs based on a performance metric of the deployed HVAC resources; and
    a deployment engine configured to:
        receive a number of actual building feature values for a second building;
        determine a building value for the second building;

compare the building value for the second building to the first value of the stored case pairs;
identify a first value from a particular case pair that corresponds to the building value for the second building based on the comparison; and
apply the MPC value of the particular case pair to the second building to deploy HVAC resources to the second building.

2. The system of claim 1, comprising a solver engine configured to generate a case pair for a portion of the received actual building feature values.

3. The system of claim 2, wherein the solver engine generates a case pair for received actual building feature values that meets or exceeds a threshold variance when compared to the plurality of ranked case pairs.

4. The system of claim 1, wherein the performance metric comprises a monitored efficiency of an HVAC system to maintain a temperature utilizing a previously calculated model.

5. The system of claim 1, wherein the number of building features comprise:
exterior weather conditions of a building;
occupancy forecast of the building;
sensor data within the building; and
building model parameters.

6. The system of claim 1, wherein the ranking engine is configured to utilize a regression model to rank the plurality of case pairs based on a variance of performance metrics.

7. A system for data-driven acceleration of deployed services, comprising:
a database configured to store a plurality of previously calculated model solutions represented as a plurality of case pairs, wherein each of the plurality of case pairs comprises a first value and a second value, the first value representative of the number of actual building features and an efficiency associated with the number of building features for a first building, wherein the first value efficiency is a predicted quantity of resources for a particular time required to maintain a particular temperature within the first building based on the number of building features, wherein the second value representative of deployed heating, ventilation, and air conditioning (HVAC) resources based on a combination of the number of building features and environmental features of the first building, and wherein the second value is representative of a model predictive control (MPC) value that was utilized to deploy resources to the first building at the particular time;
a ranking engine configured to rank the plurality of corresponding case pairs based on performance results of the case pairs; and
a deployment engine configured to:
receive a number of actual building feature values for a second building;
determining a building value for the second building;
compare the building value for the second building to the first value of the previously calculated model solutions;
identify a first value from a particular previously calculated model solution that corresponds to the building value for the second building based on the comparison; and
apply the MPC value of the previously calculated model solution to the second building to; and
deploy HVAC resources to the second building based on the previously calculated model solution.

8. The system of claim 7, comprising a solver engine configured to generate a model solution for the actual building feature values when a case pair from the plurality of case pairs does not correspond to the received actual building feature values.

9. The system of claim 8, wherein the deployment engine is configured to deploy HVAC resources based on the previously calculated model solution.

10. The system of claim 7, wherein the deployment engine is configured to determine a portion of the actual building feature values from the received actual building feature values that have a variance that meets or exceeds a threshold.

11. The system of claim 10, wherein the portion of the actual building feature values is a predetermined quantity of actual building feature values.

12. The system of claim 7, wherein the plurality of previously calculated model solutions are model solutions for deploying HVAC resources for a particular set of features.

13. The system of claim 12, wherein the particular set of features comprise features of a building where the HVAC resources are deployed.

14. The system of claim 7, wherein each of the plurality of previously calculated model solutions includes a particular set of features corresponding to a building type and actual sensor data.

15. A method for data-driven acceleration of deployed services, comprising:
ranking a plurality of case pairs based on performance results of the case pairs, wherein the plurality of case pairs each include a first value and a second value, the first value representative of a number of actual building features and an efficiency associated with the number of building features of a first building, wherein the first value efficiency is a predicted quantity of resources for a particular time required to maintain a particular temperature within the first building based on the number of building features, wherein the second value is representative of deployed heating, ventilation, and air conditioning (HVAC) resources based on a combination of the number of building features and environmental features of the first building, wherein the second value is representative of a model predictive control (MPC) value that was utilized to deploy resources to first building at the particular time;
receiving a number of actual building feature values for a second building;
determining a building value for the second building;
comparing the building value for the second building to the first value of the previously calculated model solutions
identifying a first value from a particular case pair that corresponds to the building value for the second building based on the comparison;
applying the MPC value of the particular case pair to the second building; and
deploying, HVAC resources to the second building utilizing the MPC value of the particular case pair.

16. The method of claim 15, wherein ranking the plurality of case pairs includes ranking the plurality of case pairs based on a performance of an HVAC system.

17. The method of claim 15, wherein ranking the plurality of case pairs includes calculating a model solution variance for a number of different features.

18. The method of claim 15, wherein ranking the plurality of case pairs includes determining a quantity of historical cases that utilized each of the plurality of case pairs.

19. The method of claim 15, wherein ranking the plurality of case pairs includes determining a power usage for an HVAC system that previously utilized each of the plurality of case pairs.

20. The method of claim 15, wherein ranking the plurality of case pairs is based on a variance and a quantity of historical utilization.

* * * * *